(12) United States Patent
Farquhar

(10) Patent No.: US 7,493,422 B2
(45) Date of Patent: Feb. 17, 2009

(54) LOSS OF UNIVERSAL SERIAL BUS COMMUNICATION

(75) Inventor: Stiven Farquhar, Dundee (GB)

(73) Assignee: NCR Corporation, Dayton, OH (US)

(*) Notice: Subject to any disclaimer, the term of this patent is extended or adjusted under 35 U.S.C. 154(b) by 297 days.

(21) Appl. No.: 11/273,474

(22) Filed: Nov. 14, 2005

(65) Prior Publication Data

US 2007/0130573 A1    Jun. 7, 2007

(51) Int. Cl.
*G06F 3/00* (2006.01)
*G06F 11/00* (2006.01)
*G06F 13/00* (2006.01)

(52) U.S. Cl. .............................. 710/15; 710/19; 714/36; 714/43; 719/321

(58) Field of Classification Search .................... 710/15
See application file for complete search history.

(56) References Cited

U.S. PATENT DOCUMENTS

| | | | |
|---|---|---|---|
| 6,402,024 B1 * | 6/2002 | Carnegie et al. | 235/379 |
| 6,625,761 B1 * | 9/2003 | Sartore et al. | 714/43 |
| 6,735,720 B1 * | 5/2004 | Dunn et al. | 714/43 |
| 2005/0080935 A1 * | 4/2005 | Fukae et al. | 710/1 |

* cited by examiner

*Primary Examiner*—Niketa I Patel
*Assistant Examiner*—Zachary K Huson
(74) *Attorney, Agent, or Firm*—Priest & Goldstein PLLC

(57) ABSTRACT

Triggers are developed for indicating the presence of non-recoverable and/or recoverable loss of communication situations between a device and device driver software using universal serial bus (USB) protocol. We modify the firmware at the device in order to monitor for the triggers and control the device in specified ways once a trigger is indicated. In a particularly preferred embodiment the device is a motorized card reader in a self-service terminal and the device is arranged to return a smart card when a trigger is detected. In one embodiment the trigger is associated with the presence of a single ended zero condition on the USB. In another embodiment the trigger is associated with attempts to re-enumerate the device over the USB.

18 Claims, 2 Drawing Sheets

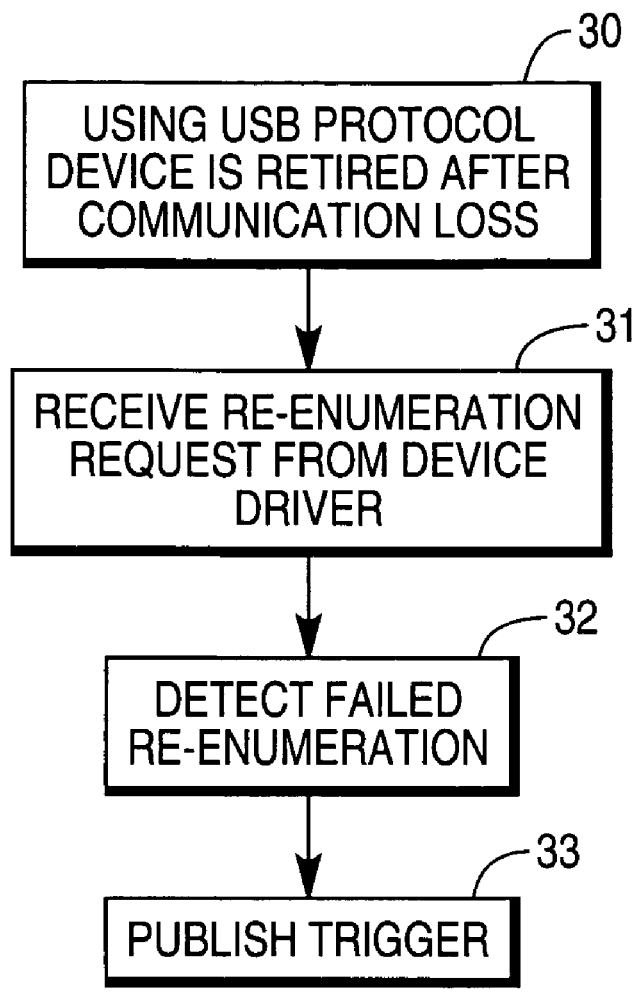

LOSS OF UNIVERSAL SERIAL BUS COMMUNICATION

The present invention relates to Universal Serial Bus (USB) communication. It is particularly related to, but in no way limited to, loss of communication over a USB connection.

BACKGROUND

Universal Serial Bus (USB) connections are widely used today to enable connections between Personal Computers (PCs) and peripheral devices such as telephones, digital cameras, scanners, keyboards, mice and PDAs. The USB specification was developed by a group of companies including Compaq, Intel, Microsoft and NEC and the USB specification documents such as USB 1.1 and USB 2.0 are publicly available. The USB specification describes the bus attributes, protocol definition, transaction types, bus management and programming interface required to comply with the standard. Using this standard it is possible to provide a fast, bi-directional, isochronous, low-cost, dynamically attachable serial interface between a PC platform and one or more devices.

In many situations, devices to be connected to a PC or other similar platform using a USB connection are arranged to take in removable media (such as smart cards, bank cards, prepayment cards, memory sticks, electronic purse cards or the like) and to output those media again when required. For example, it is known to provide a bank card reader connected to a PC via a USB connection as part of an automated teller machine (ATM) or other self-service machine. Typically a device driver is provided as software at the PC for communicating with the device over the USB connection which may be a card reader as in the example mentioned. It has been found that problems can arise with returning the removable media in situations where there is a loss of communication over the USB connection. This is particularly disadvantageous when the media is needed for use elsewhere, for example, if it provides an electronic purse or security details which are unavailable elsewhere.

SUMMARY OF THE INVENTION

According to an aspect of the invention there is provided a method of determining when a loss in communication exists between a device and a device driver said communication being effected using universal serial bus (USB) protocol over a USB, said method comprising the steps of:
  either monitoring for the presence of a single ended zero condition on the USB; or
  monitoring for the presence of a failed re-enumeration attempt of the device.

This method can be carried out by the device itself and enables it to determine when a loss of communication exists and to take pre-specified action as required.

A corresponding device is provided arranged to communicate with a device driver using universal serial bus (USB) protocol over a USB and to detect loss of said communication, said device being arranged to:
  either monitor for the presence of a single ended zero condition on the USB; or
  monitor for the presence of a failed re-enumeration attempt of the device.

The invention also encompasses firmware for use on a device arranged to communicate with a device driver using universal serial bus (USB) protocol over a USB, said firmware being arranged to control the device in order to detect loss of communication between itself and the device driver, the firmware controlling the device such that it:
  either monitors for the presence of a single ended zero condition on the USB; or
  monitors for the presence of a failed re-enumeration attempt of the device.

Preferably said communications loss is non-recoverable in that information about a current state of the device is lost to the device driver. In this case the method is particularly advantageous because in that situation, the device can be arranged to take its own action, such as returning a bank card to a customer, without receiving instructions to do so from the driver.

Preferably the method comprises generating a trigger on the basis of a duration of the presence of the single ended zero condition. For example, this duration is greater than a pre-specified threshold and said pre-specified threshold is greater than or equal to a bus reset duration of the USB. In one embodiment said pre-specified threshold is about 45 msecs.

Preferably the method further comprises generating a trigger on the basis of presence of a failed re-enumeration attempt of the device the device having previously been in a retired state.

Advantageously the device is a media handling device and said method further comprises outputting one or more media held in the media handling device. For example, said device is a motorized card reader and said method further comprises outputting one or more cards held in the card reader.

The method may be performed by software in machine readable form on a storage medium. This acknowledges that software can be a valuable, separately tradable commodity. It is intended to encompass software, which runs on or controls "dumb" or standard hardware, to carry out the desired functions, (and therefore the software essentially defines the functions of the register, and can therefore be termed a register, even before it is combined with its standard hardware). For similar reasons, it is also intended to encompass software which "describes" or defines the configuration of hardware, such as HDL (hardware description language) software, as is used for designing silicon chips, or for configuring universal programmable chips, to carry out desired functions. The software can be suitable for execution on a parallel processor or a serial processor such that the method steps may be carried out in any suitable order, or simultaneously.

The preferred features may be combined as appropriate, as would be apparent to a skilled person, and may be combined with any of the aspects of the invention.

BRIEF DESCRIPTION OF THE DRAWINGS

These and other aspects of the invention will be apparent from the following specific description, given by way of example, with reference to the accompanying drawings, in which:

FIG. 3 is a flow diagram of another method carried out at a device to detect loss of communication between that device and a device driver over USB;

DETAILED DESCRIPTION

Embodiments of the present invention are described below by way of example only. These examples represent the best ways of putting the invention into practice that are currently known to the Applicant although they are not the only ways in which this could be achieved.

Figure 1:
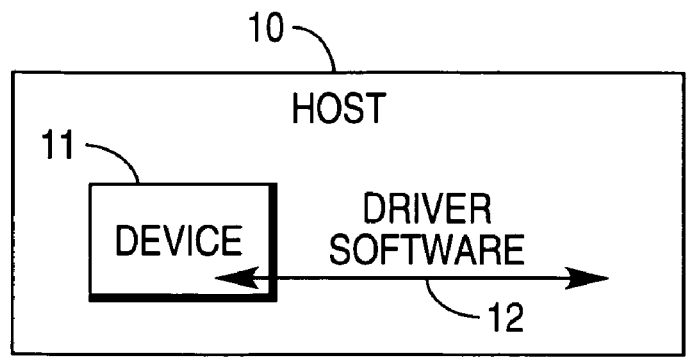
FIG. 1 is a high level schematic diagram of a device and software device driver suitable for use in the present invention.

As mentioned above the present invention is concerned with USB communication between a device and one or more device drivers in a PC or similar processor. FIG. 1 is a high level schematic diagram of a device 11 connected using USB to a host PC 10. Driver software 12 is indicated at the host 10 for facilitating communication over the USB.

In some situations communication between the device and the device driver is lost over the USB connection and this can be for a variety of reasons. For example, a user physically disconnected the device by pulling out the connector; a power failure occurred; severe Electro Magnetic Radiation (EMR) was experienced; severe Electro Static Discharge (ESD) occurred; other adverse conditions were experienced such as extreme temperature variations.

Such loss of communication is a particular problem in the case that the device comprises a removable media handling device because it can lead to the media being retained in the device. The term "removable media handling device" is used herein to refer to any device suitable for connection to a USB, which has means for removably accepting a media item. It is not essential for the device to comprise an interface for reading and/or writing data to the media item although in preferred embodiments that is the case. Thus the media item itself in some embodiments comprises storage for storing data in electronic or other form although that is not essential. For example, the removable media handling device can be a smart cart reader and the media a smart card. Other examples of suitable media include memory sticks, bank cards, identity cards, electronic purse cards, floppy disks, CDs, DVDs, Cash Recycling Module and Cheque Verification Module.

The USB protocol and specification does provide for situations involving loss of communication over the bus although the particular details for all individual situations in which communication can be lost are not all specified. That is, manufacturers and other providers who implement equipment and software according to the USB protocol do need to make some choices and design decisions which are not specified in the USB protocol and specification. We have found that some of these choices and design decisions relate to low level details concerned with loss of communication situations.

We can think of loss of communication situations over USB as being classified into two types: recoverable and non-recoverable. Recoverable situations are those in which the device state persists during the breakdown period. That is, information about the state of the device is detected and known to the USB driver. If this information is still available to the USB driver after the breakdown in communication, and it is possible to recover communication, then it is possible to continue the communication without any perceived interruption. Conversely, if the device state information is lost during the communication breakdown, then even if communication can be restarted it is not possible to continue the communication from where it left off. This type of communication loss is referred to herein as "non-recoverable".

The present invention is operable in either the recoverable or non-recoverable situations mentioned above. However, at least part of the present invention lies in recognizing that particular problems are found in the case of non-recoverable situations. For non-recoverable communication loss, because the state information about the device is lost it has not previously been possible to control the device using the device driver in many situations. This loss of control has prevented removable media from being returned or output in the case that the device is a removable media handling device.

In the particular case where the device is a motorized card reader in a self-service terminal it is known to deal with some particular non-recoverable communications loss situations. These are situations involving power failure.

Power Failure Situation

It is known to arrange a motorized card reader to detect a loss of supply voltage. This is achieved using known methods that do not involve USB communications. The device detects the supply voltage dropping and switches to a secondary "battery source" eliminating any effect of the drop in supply voltage influencing the operation of the device. The device then completes its current operation if any, and invokes a pre-specified method to give a customer the opportunity to retain his or her media (such as a bank card).

There are many other non-recoverable communication loss situations however which it is required to deal with. However, we recognized that there has previously been no way in which to simply, quickly and accurately detect the presence of a loss of communication and to determine whether that loss is recoverable or non-recoverable. We provide a method for achieving this by making modifications to firmware in the device and/or to device driver software for use with the device. In order to explain how this is achieved we first set out some information about USB itself.

Background Information about USB

A USB connection is typically made between a host PC and one or more devices. The host PC controls the USB interface in order to ensure that all devices on the bus can send and receive data as needed. In order to do this the host PC obtains information about what devices are on the bus and the capabilities of those devices.

A host PC comprises a host controller and a root hub. The host controller formats data for transmitting on the bus and translates received data to a format that an operating system on the host PC can understand. In addition, the host controller performs functions related to managing communications on the bus. The root hub provides one or more connectors for attaching devices, where those devices can also be hubs themselves. Thus the arrangement of connections on a USB is a tiered star with a hub at the center of each star. A hub is a device comprising one or more USB ports for connecting to devices and hardware to enable communication with each device.

Typically a device is a peripheral such as a keyboard, mouse, scanner, external disk drive, printer or standard or custom hardware of all kinds. It is also possible for a device to be a hub or a compound device (a device which comprises both a hub and one or more functions where a function is a device that provides a single capability to the host). Each USB device attached to a host is associated with a device driver, which is a software component that enables applications running on the host PC to communication with the device.

A transfer over USB involves transmission of packets of information. All transmissions travel to or from a device endpoint which is a buffer that stores multiple bytes. For example, the endpoint comprises a block of data memory or a register in a controller chip at the device. The host PC also has buffers for received data and data ready to transmit but it is not considered as having any endpoints. USB provides for four different transfer types with different transfer rates, response times, and error correcting. These types are referred to as Control; Bulk; Interrupt and Isochronous.

Enumeration

The process of enumeration enables the host to learn about devices. It occurs at power-up for example when the hubs make the host aware of all attached USB devices. During enumeration the host assigns an address for each device and requests additional information from each device about what transfer types and endpoints the device supports. The host also enumerates any newly attached device.

Enumeration of a device comprises assigning an address to that device, reading descriptive data from the device, assigning and loading a device driver and selecting a configuration from the options presented in the retrieved data. A host enumerates by sending control transfers containing standard USB requests to Endpoint 0.

Electrical Interface

A USB device comprises a controller chip for converting between signals on the bus and TTL logic levels. Such a controller chip typically comprises a USB transceiver comprising a differential driver and a receiver required to send and receive data on the bus. The driver has two outputs (two signal wires) that are 180 degrees out of phase when transmitting. Generally, when one output is high the other is low and the receiver detects the voltage difference between the two lines or wires. These voltages are typically referred to as D− and D+. The signal is defined as a differential 1 when D+ is more positive than D−. When D− is more positive than D+ the signal is a differential 0. Such a link is referred to as a balanced line.

The controller chip typically also comprises two single-ended receivers that detect the D+ and D− voltages with respect to signal ground.

In addition to the differential 1s and 0s of transmitted data, USB defines two other valid states indicated by voltages D+ and D−. These states are the idle state and the single-ended zero state.

The single-ended-zero state is defined as occurring when both D+ and D− are 0.3V or less at the driver and 0.8 V or less at the receiver. USB defines conditions for entering particular states and the following states use single-ended zeros in those conditions: End-of-Packet, Disconnect and Reset.

As mentioned above, the USB protocol and specification does provide for situations involving loss of communication over the bus although the particular details for all individual situations in which communication can be lost are not all specified. That is, manufacturers and other providers who implement equipment and software according to the USB protocol do need to make some choices and design decisions which are not specified in the USB protocol and specification. We therefore carried out empirical tests of various devices connected using USB to device driver software (of different types) supported on PC platforms (of different types) with various operating systems. In this way we were able to identify particular characteristics associated with several loss of communication situations including non-recoverable loss situations. By using these particular characteristics we have been able to develop triggers for indicating the presence of non-recoverable and/or recoverable loss of communication situations. We modify the firmware at the device in order to monitor for and send information about the presence of the triggers to device driver software over the USB. (Obviously, sending information about the triggers to the device driver software is only applicable in situations where communication is recovered after the loss.) In addition we modify or arrange the device firmware to control the device in specified ways once a trigger is indicated. In a particularly preferred embodiment the device firmware is arranged to cause a media handling device to carry out a pre-specified method to return or output a removable media from the device.

In one embodiment the trigger is associated with the presence of a single ended zero condition on the USB. In another embodiment the trigger is associated with attempts to re-enumerate the device over the USB.

Single Ended Zero Condition

A fundamental element using during USB protocol communication is the single ended zero (SE0). We have found that detection of a substantially constant SE0 for a duration greater than that defined in the standard for a BUS-RESET (e.g. 20 msecs) is a reliable indication of a non-recoverable communication loss. For example, this indicates a catastrophic failure such as powering down of the PC, "Control Alt Delete" command issued at the PC, and it indicates failure of the whole bus. We therefore modify or arrange the firmware at the device to monitor for detection of a substantially constant SE0 for a duration greater than a pre-specified threshold. The device can be modified or arranged in any suitable manner in order to carry out this detection process. In practice we have set the threshold at about 45 msecs and found this to give reliable, accurate results. However, any suitable threshold greater than the BUS-RESET duration can be used. There are some situations in which SE0s occur for valid reasons, not associated with a loss of communication. We are able to effectively "filter out" these situations however, by setting the threshold duration appropriately.

Figure 2:
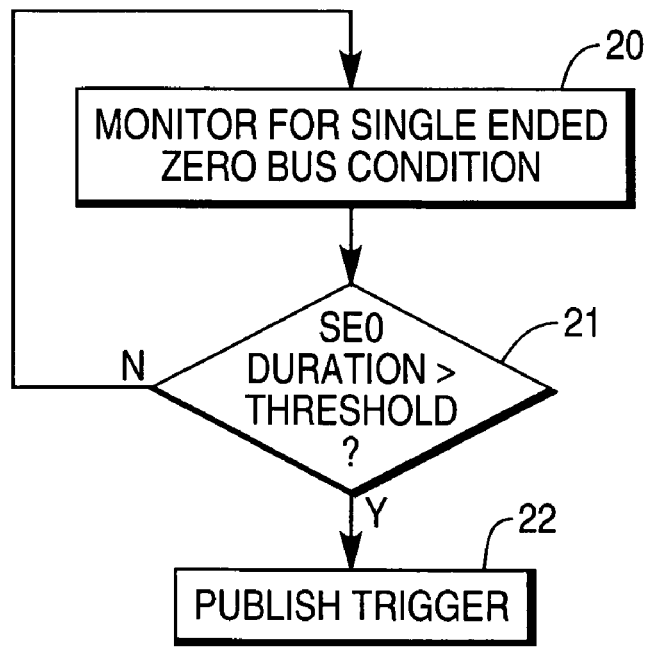
FIG. 2 is a flow diagram of a method carried out at a device to detect loss of communication between that device and a device driver over USB.

FIG. 2 is a flow diagram of a method carried out at the device in order to implement this detection process. A chip controller or equivalent at the device monitors for a single-ended zero state (see box 20) and checks whether this state has been present for a duration greater than a pre-specified threshold (see box 21). If not, the method repeats and continues to monitor for the single-ended zero state until the threshold duration is met. At that point a trigger is published (see box 22). This publication is made to other software or firmware at the device itself but not necessarily to the host PC in view of the fact that communication has been lost over the USB.

Re-Enumeration Condition

In another embodiment the device is arranged to monitor for failed re-enumeration attempts. When device communication is lost over the USB protocol (i.e. USB has attempted to transfer the same packet of information three times without success) the device will be retired, and interaction with the device is lost. For example, retiral occurs when there is a fault at the device itself. USB then attempts to re-enumerate the device according to the USB specification. However, if the error condition persists the device is unable to successfully re-enumerate and we have found empirically that a cycle of repeated attempts to re-enumerate can follow. We therefore arrange for the device to detect such failed re-enumeration attempts and to issue a trigger in that event. The flow diagram of FIG. 3 shows the method carried out at the device.

In the situation where the device fails to re-enumerate, that device is arranged, as part of the USB standard to do its upmost to attempt to re-establish the USB connection. The device automatically attempts to induce further re-enumeration attempts by toggling a Pull-Up resistor on the Data Line. It is this application of the Pull-Up resistor that indicates the "attachment" of the device, and initiates the consequent Enumeration by the Host. The embodiment of FIG. 3 is therefore providing a safety net to ensure that this activity does not result in an infinite loop without the card being returned to the customer (in the case that the device is a motorized card reader or similar).

Under the USB protocol it is possible for a device to be retired as a result of communication loss over USB (box 30 of FIG. 3). That retired device later receives a re-enumeration request from its associated device driver (box 31) as is known from the USB specification. In the case that the re-enumeration attempt fails the device is arranged to detect this (see box 32) according to an aspect of the present invention. The device then publishes a trigger (see box 33) to itself and/or the host PC in the case that some communication over the USB is retained or resumed.

In a preferred embodiment the device is a media handling device such as a motorized card reader in a self-service terminal. In that case the firmware at the device is preferably also arranged to initiate a card-return-or-capture cycle in the case that a trigger is activated. This gives a customer or other end user the option to retain his or her card. However, the triggers can be used for any other suitable purposes such as to cause the card to be captured. In other embodiments the device is not necessarily a media-handling device and the trigger is used to cause initiation of any pre-specified action at the device such as causing it to switch off, make a sound or visual indication to alert an end user to the loss of communication, carry out safety procedures, anti-theft or anti-tampering procedures or any other suitable actions.

In some situations, the loss of communication is referred to herein as non-recoverable because the device state is lost. However, if communication is re-enabled, for example, because the device is reconnected to the PC after having been disconnected, then the trigger information published by the device is able to reach the device driver software at the PC. In that case, the trigger information is very useful to the device driver because it indicates that a non-recoverable communications loss has taken place. The device driver software is then able to make use of this information in its future commands to the device itself.

Any range or device value given herein may be extended or altered without losing the effect sought, as will be apparent to the skilled person.

The steps of the methods described herein may be carried out in any suitable order or simultaneously where appropriate.

It will be understood that the above description of a preferred embodiment is given by way of example only and that various modifications may be made by those skilled in the art.

What is claimed is:

1. A method of determining by a removable media handling device which is part of a self-service terminal when a loss in communication exists between the removable media handling device and a device driver, said communication being effected using universal serial bus (USB) protocol over a USB, said method comprising the steps of:
   (i) monitoring by the removable media handling device for the presence of a single ended zero condition on the USB;
   (ii) monitoring by the removable media handling device for the presence of a failed re-enumeration attempt of said device; and
   (iii) upon detection by the removable media handling device of a single ended zero condition or a failed re-enumeration attempt meeting predetermined criteria chosen to indicate that said device is experiencing an unrecoverable loss of USB communication, recognizing that an unrecoverable loss of USB communication has occurred and directing the removable media handling device by firmware to perform a predetermined action chosen as a response to loss of communication, said predetermined action including outputting any media held in the removable media handling device.

2. A method as claimed in claim 1, wherein the recognition that the loss of USB communication is unrecoverable includes recognition that information about a current state of the removable media handling device has been lost to the device driver.

3. A method as claimed in claim 1, which further comprises generating a trigger on the basis of a duration of the presence of the single ended zero condition.

4. A method as claimed in claim 3, wherein said trigger is generated when said duration is greater than a pre-specified threshold.

5. A method as claimed in claim 4, wherein said pre-specified threshold is greater than a bus reset duration of the USB.

6. A method as claimed in claim 4, wherein said pre-specified threshold is about 45 milliseconds.

7. A method as claimed in claim 1, which further comprises generating a trigger on the basis of presence of a failed re-enumeration attempt of the device the device having previously been in a retired state.

8. A method as claimed in claim 1, wherein said removable media handling device is a motorized card reader and said outputting any media comprises initiating a card return by the removable media handling device.

9. A method as claimed in claim 8, wherein said motorized card reader is a bank card reader which is part of an automated teller machine, and said outputting any media comprises returning the bank card by the bank card reader.

10. A removable media handling device which is part of a self service terminal, the removable handling device connected to communicate with a device driver using universal serial bus (USB) protocol over a USB and employing firmware to detect loss of said communication, said removable handling device being arranged to:
    (i) monitor for the presence of a single ended zero condition on the USB;
    (ii) monitor for the presence of a failed re-enumeration attempt of the device; and
    (iii) upon detection of a single ended zero condition or a failed re-enumeration attempt meeting predetermined criteria chosen to indicate that the device is experiencing an unrecoverable loss of USB communication, recognizing that an unrecoverable loss of USB communication has occurred and outputting media held in the removable media handling device by the removable media handling device in response to loss of communication.

11. The device as claimed in claim 10 in the removable media handling device comprises a motorized bank card reader and the outputting media comprises a bank card return.

12. A device as claimed in claim 10 in which the removable media handling device comprises a motorized card reader and the outputting media comprises a smart cards return by the self-service terminal.

13. A device as claimed in claim 10, wherein the recognition that the loss of communication is unrecoverable includes recognition that information about a current state of the removable media handling device has been lost to the device driver.

14. A device as claimed in claim 10, comprising a trigger generator arranged to generate a trigger on the basis of a duration of the single ended zero condition.

15. A device as claimed in claim 14, wherein said trigger is generated when said duration is greater than a pre-specified threshold.

16. A device as claimed in claim 15, wherein said pro-specified threshold is greater than or equal to a bus reset duration of the USB.

17. A device as claimed in claim 15, wherein said pro-specified threshold is about 45 milliseconds.

18. A device as claimed in claim 10, comprising a processor arranged to generate a trigger on the basis of presence of a failed re-enumeration attempt of the device.

* * * * *

UNITED STATES PATENT AND TRADEMARK OFFICE
CERTIFICATE OF CORRECTION

| | |
|---|---|
| PATENT NO. | : 7,493,422 B2 |
| APPLICATION NO. | : 11/273474 |
| DATED | : February 17, 2009 |
| INVENTOR(S) | : Stiven Farquhar |

It is certified that error appears in the above-identified patent and that said Letters Patent is hereby corrected as shown below:

Column 9, line 1, after "said" delete "pro-" and insert --pre- --.

Signed and Sealed this

Thirtieth Day of March, 2010

David J. Kappos
*Director of the United States Patent and Trademark Office*